United States Patent [19]

Peter

[11] 4,193,300

[45] Mar. 18, 1980

[54] SIGNAL LINEARIZING CIRCUIT FOR INTERNAL COMBUSTION ENGINES

[75] Inventor: Cornelius Peter, Stuttgart, Fed. Rep. of Germany

[73] Assignee: Robert Bosch GmbH, Stuttgart, Fed. Rep. of Germany

[21] Appl. No.: 925,488

[22] Filed: Jul. 17, 1978

[30] Foreign Application Priority Data

Jul. 20, 1977 [DE] Fed. Rep. of Germany ....... 2732715

[51] Int. Cl.² .............................................. G01F 1/68
[52] U.S. Cl. ................................. 73/204; 364/510; 364/573
[58] Field of Search .................. 73/116, 204; 364/510, 364/557, 573, 857

[56] References Cited

U.S. PATENT DOCUMENTS

| | | | |
|---|---|---|---|
| 3,363,462 | 1/1968 | Sabin | 73/204 |
| 3,595,079 | 7/1971 | Grahn | 73/204 |
| 4,043,196 | 8/1977 | Trageser | 73/204 |
| 4,070,908 | 1/1978 | Newell | 73/204 |

*Primary Examiner*—Herbert Goldstein
*Attorney, Agent, or Firm*—Edwin E. Greigg

[57] ABSTRACT

A circuit arrangement for linearizing the output signal of a probe such as a hot-wire probe used for quantitative air measurement in the intake manifold of an internal combustion engine which includes a log stage, a multiplier stage and an antilog stage connected in series, the probe signal being applied to the input of the log stage and the linearized output signal taken from the output of the antilog stage.

7 Claims, 4 Drawing Figures

4,193,300

SIGNAL LINEARIZING CIRCUIT FOR INTERNAL COMBUSTION ENGINES

BACKGROUND OF THE INVENTION

The invention is based on a circuit arrangement for the approximate linearization of the output signal of hot-wire probes. This output signal is in an approximate parabolic correlation with the rate of air flow in the intake manifold of an internal combustion engine, and a squaring of the output signal serves for an approximate linearization. However, since the correlation between the rate of air flow and the probe output signal has only an approximate parabolic configuration, the linearizing process carried out in the circuit arrangement of the prior art is deficient, whereby errors can occur during the processing of the probe output signal.

OBJECT, SUMMARY AND ADVANTAGES OF THE INVENTION

The invention proposes a circuit arrangement for linearizing the output signal of, in particular, hot-wire probes in the quantitative measurement of air in the intake manifold of internal combustion engines. If hot-wire probes or hot-film probes are utilized in the measurement of the rate of air flow in the air intake manifold of internal combustion engines, the output signal of the probe has no linear relationship with the rate of air flow. However, linearity is desirable for evaluating the signal indicating the air quantity, at least because of unambiguity of the measured values and to further simplify the processing of the output signal. This output signal shows, in case of hot-wire probes regulated for constant temperature, an approximate parabola-shaped curve plotted with respect to the quantity of air taken in per unit of time. The present circuit arrangement for rendering the output signal linear comprises a series circuit of a log stage, a multiplier stage and an antilog stage, wherein a signal can be produced through the multiplication factor of the multiplier stage which is approximately linear to the rate of air flow in the intake manifold.

The arrangement according to this invention with the characterizing features of the main claim has the advantage, as contrasted to the above, that the type of adaptation or the transient response of the circuit arrangement for linearization can be readily set and thus, with the aid of a balancing procedure, an optimum of linearity can be attained.

By means of the disposition of the various components utilized, the circuit arrangement of the invention can be advantageously enhanced. Thus, it is especially advantageous to place the active elements of the individual stages into close temperature contact in order to maintain the effect of temperature on the linearization at a minimum.

The invention will be better understood as well as further objects and advantages thereof become more apparent from the ensuing detailed description of a preferred embodiment taken in conjunction with the drawings.

DESCRIPTION OF THE PREFERRED EMBODIMENT

Figure 1:
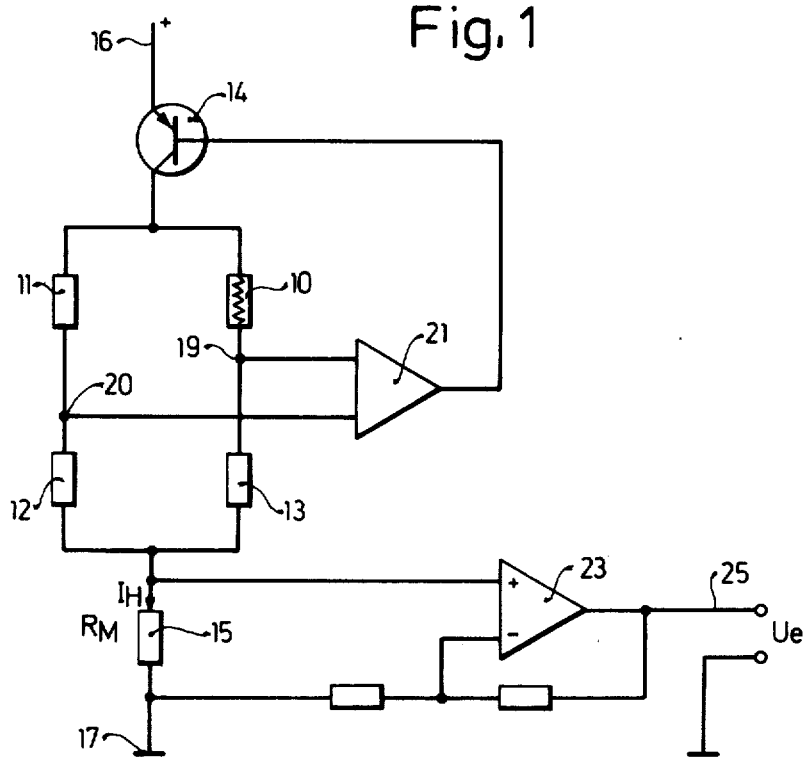
FIG. 1 shows a circuit for a hot-wire probe utilized in the circuit arrangement of the invention.

The linearizing circuit of this invention is utilized for processing the output signal of a measuring probe measuring the air quantity in the air intake manifold of an internal combustion engine. In FIG. 1, there is shown a hot-wire probe 10 with a temperature-dependent resistor as the quantitative measuring probe. The probe 10 is included in a bridge circuit comprising additional resistors 11, 12 and 13 and this bridge circuit, in turn, is connected in series with a transistor 14 and a resistor 15 between a positive line 16 and a negative line 17. The diagonal points 19 and 20 of the bridge are connected to an amplifier 21, the output of which is connected to the base of transistor 14 connected in series with the bridge circuit. The resistor 15 is constructed as a measuring resistor (RM), and the voltage drop which occurs across resistor 15 is fed to an amplifier 23 provided with negative feedback. At the output 25 of the hot-wire probe circuit, a signal is thus obtained which corresponds to the voltage drop across resistor 15.

The circuit shown for the bridge with the hot-wire probe 10 and the resistors 11-13 operates to maintain the hot-wire probe at a constant temperature. In this connection, the temperature of the hot-wire probe is determined from its resistance and thus from the detuning of the bridge, and the bridge current is correspondingly increased until the bridge is once again tuned. The total current through the bridge is therefore dependent on the rate of air flow in the intake manifold, with the relationship shown in the curve of FIG. 2a.

Figure 2:
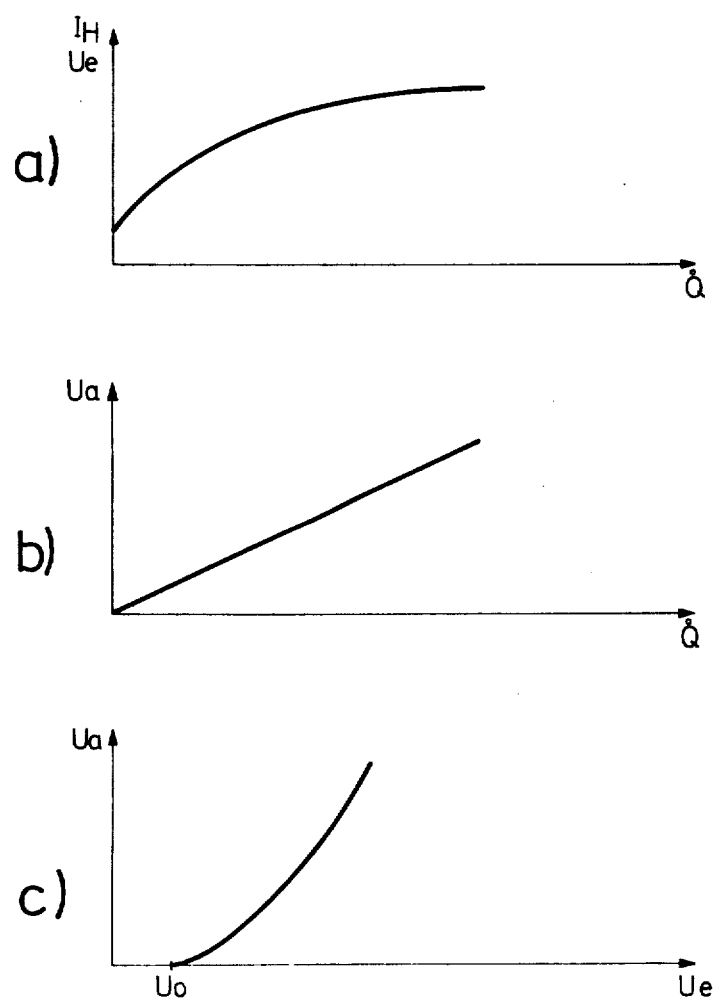
FIG. 2 shows curves relating to the output signal of the hot-wire probe and the mode of operation of the circuit arrangement for linearization.

FIG. 2a shows that, for a constant temperature of the hot-wire probe 10, bridge current rises with an increase in the rate of air flow in the intake manifold. The current flowing through the bridge is converted in resistor 15 into a voltage, and this voltage is amplified and decoupled at output 25 for processing in the circuit arrangement for linearization. FIG. 2a demonstrates the nonlinearity between rate of air flow $\dot{Q}$ and output voltage Ue, in that the rate of voltage increase is reduced with an increasing rate of air flow.

The circuit arrangement of the invention for linearizing the output signal of the hot-wire probe is thus provided for eliminating this nonlinearity and operates to transmit an an output signal according to FIG. 2b with a maximum linearity. For this purpose, a non-linearity must exist between the input voltage Ue and the output voltage Ua in the circuit arrangement for linearizing the output signal of the hot-wire probe, as is illustrated in FIG. 2c. Mathematically, this relationship can be defined as follows:

$$Ua = (Ue - Uo)^m = (R_{15} \cdot I(\dot{Q}) - Uo)^m$$

In this formula, Uo and m are free parameters which are determined by the probe configuration.

Figure 3:
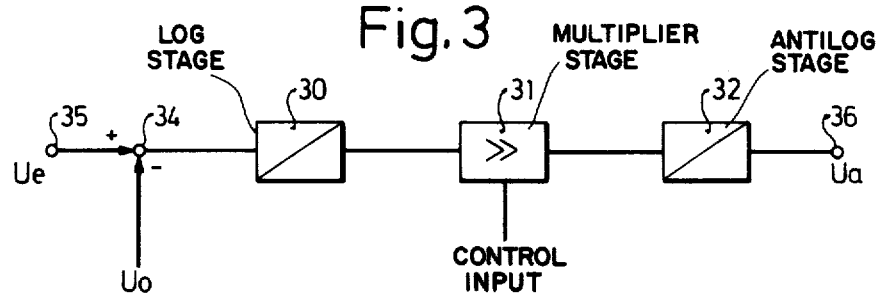
FIG. 3 is a block diagram of the circuit arrangement of the invention.

The block circuit diagram of the invention shown in FIG. 3 produces the aforementioned desired mathematical function. This circuit arrangement is characterized by a log stage 30, a multiplier stage 31, as well as an antilog stage 32. An adder point 34 is connected in front of the log stage 30 to which is applied from an input 35, the input signal Ue appearing at the output 25 of the hot-wire probe circuit of FIG. 1. Additionally, the signal Uo is applied to the adder point 34. The linearized signal appears at the output 36 of the antilog stage 32 according to FIG. 2b. By means of the circuit shown in FIG. 3, it is possible to set, by the factor of the multiplier stage 31, which is provided with a control input, any desired powers of the value m and thus obtain an optimum linearization of the input signal applied to input 35. The basic idea of the circuit arrangement of the invention resides in making use of the mathematical laws of forming a logarithm, according to which an exponentiation, after forming the logarithm, is subjected to a multiplication. Therefore, it is necessary to provide a log stage for the input signal, a multiplier stage, and an antilog stage 32 for recovering the input signal, from which the logarithm has been formed and which has been multiplied.

Figure 4:
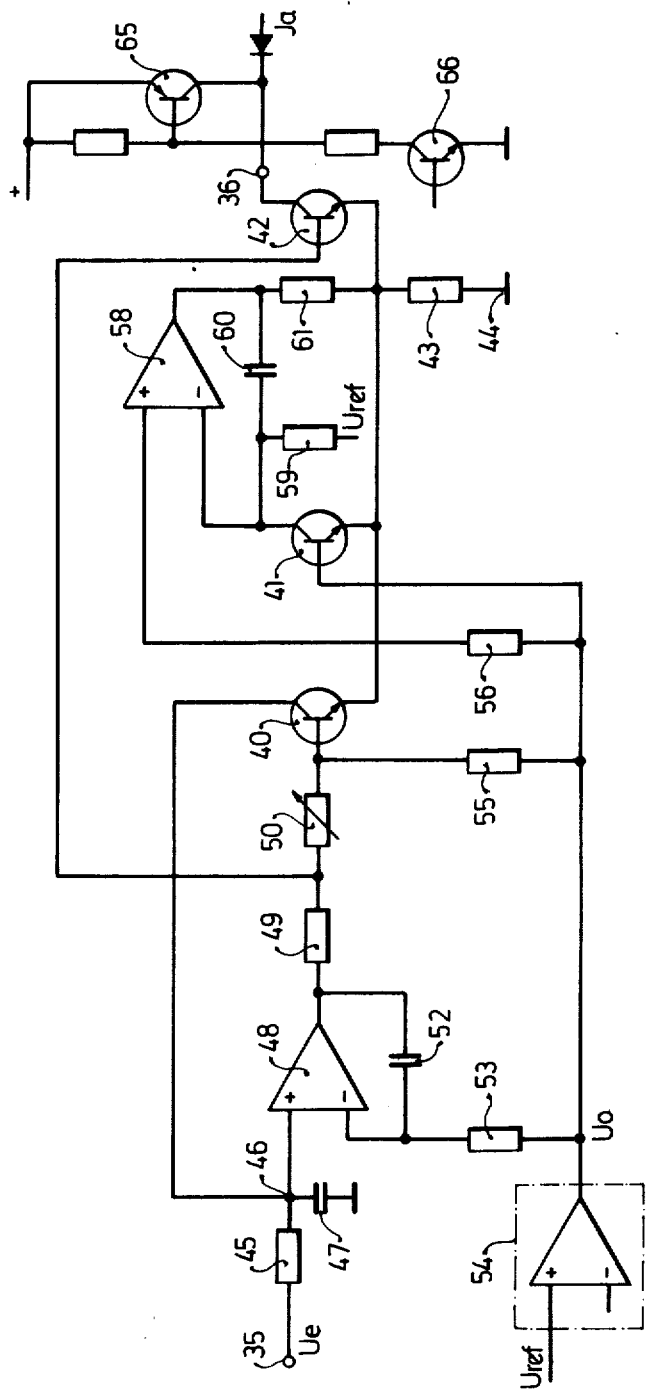
FIG. 4 shows a detailed wiring diagram of the circuit arrangement of the invention.

A detailed circuit arrangement for linearizing the output signal of hot-wire probes is shown in FIG. 4. The primary components of the circuit arrangement are three transistors 40, 41 and 42, the emitters of which are combined and are connected via a resistor 43 to a ground wire 44. From the input 35 of the circuit arrangement, a resistor 45 is connected to a junction point 46 from which a capacitor 47 is connected to ground and to which are connected the collector of the transistor 40 as well as the positive input of an amplifier 48. The output of the amplifier 48 is conducted by way of a series circuit of two resistors 49 and 50 to the base of transistor 40. The negative input of the amplifier 48 is connected via a capacitor 52 to the output of this amplifier 48 and, in addition, via a resistor 53 to the output of a voltage control stage 54 which produces, starting with a reference voltage Uref, a reference voltage Uo at its output. This reference voltage Uo is necessary since log and antilog circuits require three voltage potentials, whereas the power circuit of an automotive vehicle has only two potentials, namely positive and zero. It is especially advantageous to optimize this Uo as the correction variable for the linearization. Through a resistor 55, the base of transistor 40 is connected to the output of the voltage control stage 54. Furthermore, the base of the transistor 41 is directly connected to the output of the voltage control stage 54 through a resistor 56; the positive input of an amplifier 58 is connected to the output of the voltage control stage 54. The reference voltage Uref is applied via a resistor 59 to the negative input of the amplifier 58 as well as to the collector of transistor 41. The negative feedback of the amplifier 58 is effected via a capacitor 60, and the output of amplifier 58 is coupled via a resistor 61 with the interconnected emitters of transistors 40 to 42. While the base of transistor 42 is connected to the junction point of resistors 49 and 50 between the output of amplifier 48 and the base of transistor 40, the collector of the transistor 42 is connected to the output 36 of the circuit arrangement of the invention wherein the output signal of a hot-wire probe is linearized.

The transistor 42 at the output 36 is supplied with current from a voltage-controlled current source with a transistor 65, voltage control being effected by way of a transistor 66.

In a practical example of the present circuit arrangement, the magnitude of current depends on the rate of air flow in the intake manifold and is arranged to be modulated in accordance with speed signals from the internal combustion engine. The current control system with transistors 65 and 66 at the output 36, as shown in FIG. 4, serves this purpose.

In order to render the circuit of FIG. 4 independent of temperature, it is expedient to place at least the three transistors 40–42 into close temperature contact. This makes it possible to attain a compensation of the temperature characteristics of the individual stages shown in FIG. 3.

The variable resistor 50 connected to the base of transistor 40 serves to set the desired value of exponent m. Another parameter, namely the reference voltage Uo, can be set by means of the circuit of the voltage control stage 54, not shown. By means of these two variables, it is possible to accomplish a simple and exact adaptation of the circuit to any desired transducer type, such as, for example, hot-wire probes or hot-film probes, thus assuring a universal usefulness of the circuit arrangement for linearization.

In addition to the exact linearization of the output signal of, for example, hot-wire probes, the two parameters Uo and m (value of the exponent) can also serve to produce any desired output function. For example, it may include subsequent circuit arrangements in a linearization which has an overall effect. This aspect becomes especially significant in charging processes utilizing the output signal from a measuring probe wherein, for example, the nonlinearity of a charging process at a capacitor can be altered to obtain, in the final result, a linear correlation between the capacitor voltage and the probe output signal.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A circuit arrangement for linearizing the output signal of a quantitative measuring probe preferably arranged as a bridge circuit including a temperature-dependent resistor and adapted particularly for the measurement of the quantity of air flowing in the intake manifold of an internal combustion engine, comprising in combination, a log stage, a multiplier stage and an antilog stage connected in series and means for feeding the probe signal to the input of said log stage to produce a linearized output signal at the output of said antilog stage.

2. A circuit arrangement according to claim 1, including means for setting the multiplication factor of said multiplier stage to a value which is optimal for the linearity of the output signal of the circuit arrangement for linearization.

3. A circuit arrangement according to claim 1 including means for setting the multiplication factor of said multiplier stage to a value related to the electrical characteristics of the adjacent stages and especially the subsequent stages.

4. A circuit arrangement according to claim 1, wherein at least the active components of said log stage, said multiplier stage and said antilog stage are arranged in close mutual temperature contact to compensate for the temperature characteristics of the individual stages.

5. A circuit arrangement according to claim 1, including means for producing a reference voltage to provide a third potential in addition to the positive and zero potentials in the circuit arrangement, means for feeding said reference voltage to at least said log stage and said antilog stage, the difference between the voltage of the probe signal and said reference voltage forming a logarithm and the value of said reference voltage being selected so as to be equal to the optimum value for linerization.

6. A circuit arrangement according to claim 1 including a first transistor, a second transistor and a third transistor, the emitters of said transistors being connected together and connected through a resistor to ground, means for feeding said probe signal directly to the collector of said first transistor, means including a first amplifier stage for feeding said probe signal to the base of said first transistor, a second amplifier stage connected between the collector and the emitter of said second transistor, means for connecting the base of said third transistor to the junction between the base of said first transistor and the output of said first transistor and the output of said first amplifier stage, the collector of said third transistor forming the output for said linearized output signal and the bases of said first and second transistors both connected to one reference potential.

7. A circuit arrangement according to claim 1 including a controllable current source having a transistor connected to the output of said antilog stage.

* * * * *